US006901475B2

(12) United States Patent
Porterfield

(10) Patent No.: US 6,901,475 B2
(45) Date of Patent: May 31, 2005

(54) LINK BUS FOR A HUB BASED COMPUTER ARCHITECTURE

(75) Inventor: A. Kent Porterfield, New Brighton, MN (US)

(73) Assignee: Micron Technology, Inc., Boise, ID (US)

(*) Notice: Subject to any disclaimer, the term of this patent is extended or adjusted under 35 U.S.C. 154(b) by 491 days.

(21) Appl. No.: 09/730,608

(22) Filed: Dec. 7, 2000

(65) Prior Publication Data

US 2002/0120803 A1 Aug. 29, 2002

(51) Int. Cl.⁷ .................. G06F 13/36; G06F 13/00; G06F 13/20; G06F 13/24
(52) U.S. Cl. .................. 710/310; 710/112; 710/260; 710/313
(58) Field of Search ................ 710/315, 305, 710/311, 38, 100; 370/402

(56) References Cited

U.S. PATENT DOCUMENTS

| | | | |
|---|---|---|---|
| 5,751,975 A | * 5/1998 | Gillespie et al. ............ 710/315 |
| 5,796,960 A | 8/1998 | Bicevskis et al. |
| 5,941,964 A | * 8/1999 | Young et al. ............ 710/100 |
| 5,991,833 A | 11/1999 | Wandler et al. |
| 6,006,291 A | * 12/1999 | Rasmussen et al. .......... 710/38 |
| 6,029,223 A | 2/2000 | Klein |
| 6,047,349 A | 4/2000 | Klein |
| 6,070,215 A | 5/2000 | Deschepper et al. |
| 6,092,219 A | 7/2000 | Porterfield |
| 6,094,700 A | 7/2000 | Deschepper et al. |
| 6,119,192 A | * 9/2000 | Kao et al. ................. 710/311 |
| 6,567,414 B2 | * 5/2003 | Deng et al. ................. 370/402 |
| 6,609,171 B1 | * 8/2003 | Singh et al. ................ 710/305 |
| 2002/0112119 A1 | 8/2002 | Halbert et al. |

FOREIGN PATENT DOCUMENTS

GB  2339035 A  * 1/2000  ........... G06F/13/24

OTHER PUBLICATIONS

PCI SIG, PCI Local Bus Specification, Jun. 1, 1995, PCI Special Interest Group, Revision 2.1, pp. 7–19 and 35–53, and 84–91.*

PCI SIG, PCI-to-PCI bridge Architecture Specification, Dec. 18, 1998, PCI Special Interest Group, Revision 1.1, pp. 19–56.*

* cited by examiner

Primary Examiner—Glenn A. Auve
Assistant Examiner—Christopher E. Lee
(74) Attorney, Agent, or Firm—Dickstein Shapiro Morin & Oshinsky LLP

(57) ABSTRACT

A hub based computer system having a central hub that communicates with a plurality of satellite devices over respective link buses. Each link bus is substantially the same and adheres to a predefined link bus protocol. The satellite devices are also connected to industry standard buses/devices and the central hub also communicates with a processor cluster and system memory over respective processor and memory buses. Thus, all components within the system are capable of communicating with each other through the hub. By communicating over the link buses via the link bus protocol, satellite devices can report events to other devices without dedicated wiring/pins between the devices as is currently performed in the prior art. In addition, the flushing of data buffers is governed by the protocol such that only targeted data buffers are flushed, which improves overall system performance.

51 Claims, 6 Drawing Sheets

LINK BUS FOR A HUB BASED COMPUTER ARCHITECTURE

FIELD OF THE INVENTION

The invention relates to computer systems, and more particularly to a link bus for a hub based computer architecture.

BACKGROUND OF THE INVENTION

A hub based computer architecture is a computer topology that uses a central hub as an interface between system memory, processor cluster and multiple satellite hubs. Typically, each satellite hub is connected to the central hub and interfaces with (or serves as a bridge to) one or more industry standard buses, such as the PCI (peripheral component interconnect), PCI-X (peripheral component interconnect extended), AGP (accelerated graphics port) buses. On the other hand, the connection between the satellite hubs and the central hub is typically made through a non-standard bus.

In a PC bus architecture, for example, there may be a hub satellite generally referred to as the south bridge. The south bridge contains much of the "legacy" functions of the computer system, such as e.g., the real time clock (RTC), floppy disk controller and certain DMA (direct memory access) and CMOS (complimentary metal-oxide semiconductor) memory registers. The south bridge may also contain interrupt controllers, such as the input/output (I/O) APIC (advanced programmable interrupt controller).

Certain events on the satellites that interface to the industry standard buses must be reported to an interrupt controller within the south bridge (or other similar satellite if a PC architecture is not used). These events may include error status or bus interrupts. For example, the PCI bus includes parity error status (PERR), system error status (SERR) and various interrupts. Traditionally, these events are connected directly to the south bridge, which requires dedicated pins and connections. These dedicated pins and connections make the system difficult to expand or reconfigure and often requires the addition of "glue logic" components to reconfigure the system architecture. Thus, it would be desirable to report events in a hub based architecture without the use of dedicated connections between satellites so that the system is scaleable and substantially easy to setup, reconfigure and upgrade. This would allow the system to use many different configurations.

During operation, hub based computer architectures sometimes require the flushing of data buffers to ensure that input data will be coherent in memory. Typically this arises after the occurrence of an isochronous event (i.e., irregularly occurring event). One type of isochronous event is an unscheduled interrupt. In a PC architecture, for example, the I/O APIC uses a separate side band bus to communicate interrupt events to the processor cluster. Prior to issuing an interrupt event to the processor cluster, the south bridge must ensure that all data buffers upstream from an interrupting device (e.g., a device or satellite connected to an industry standard bus) are flushed to memory to ensure coherency.

Traditionally, all upstream buffers are flushed by the south bridge prior to issuing the interrupt event on the I/O APIC bus. By requiring all data buffers to be flushed, the traditional technique increases interrupt latency and thus, reduces overall system performance. Thus, there is a need and desire to provide an efficient method of flushing data buffers in a hub based computer architecture that allows individual data buffers to be targeted and flushed to improve overall system performance.

SUMMARY OF THE INVENTION

The invention reports events in a hub based architecture without the use of dedicated connections between satellites so that the system is scaleable and substantially easy to setup, reconfigure and upgrade.

The invention also provides an efficient method of flushing data buffers in a hub based computer architecture that allows individual data buffers to be targeted and flushed to improve overall system performance.

The above and other features and advantages are achieved by a hub based computer system having a central hub that communicates with a plurality of satellite devices over respective link buses. Each link bus is substantially the same and adheres to a predefined link bus protocol. The satellite devices are also connected to industry standard buses/devices and the central hub also communicates with a processor cluster and system memory over respective processor and memory buses. Thus, all components within the system are capable of communicating with each other through the hub. By communicating over the link buses via the link bus protocol, satellite devices can report events to other devices without dedicated wiring/pins between the devices as is currently performed in the prior art. In addition, the flushing of data buffers is governed by the protocol such that only targeted data buffers are flushed, which improves overall system performance by reducing interrupt latency.

BRIEF DESCRIPTION OF THE DRAWINGS

The above and other advantages and features of the invention will be more clearly understood from the following detailed description of the invention, which is provided in connection with the accompanying drawings in which.

DETAILED DESCRIPTION OF THE PREFERRED EMBODIMENTS

Figure 1:
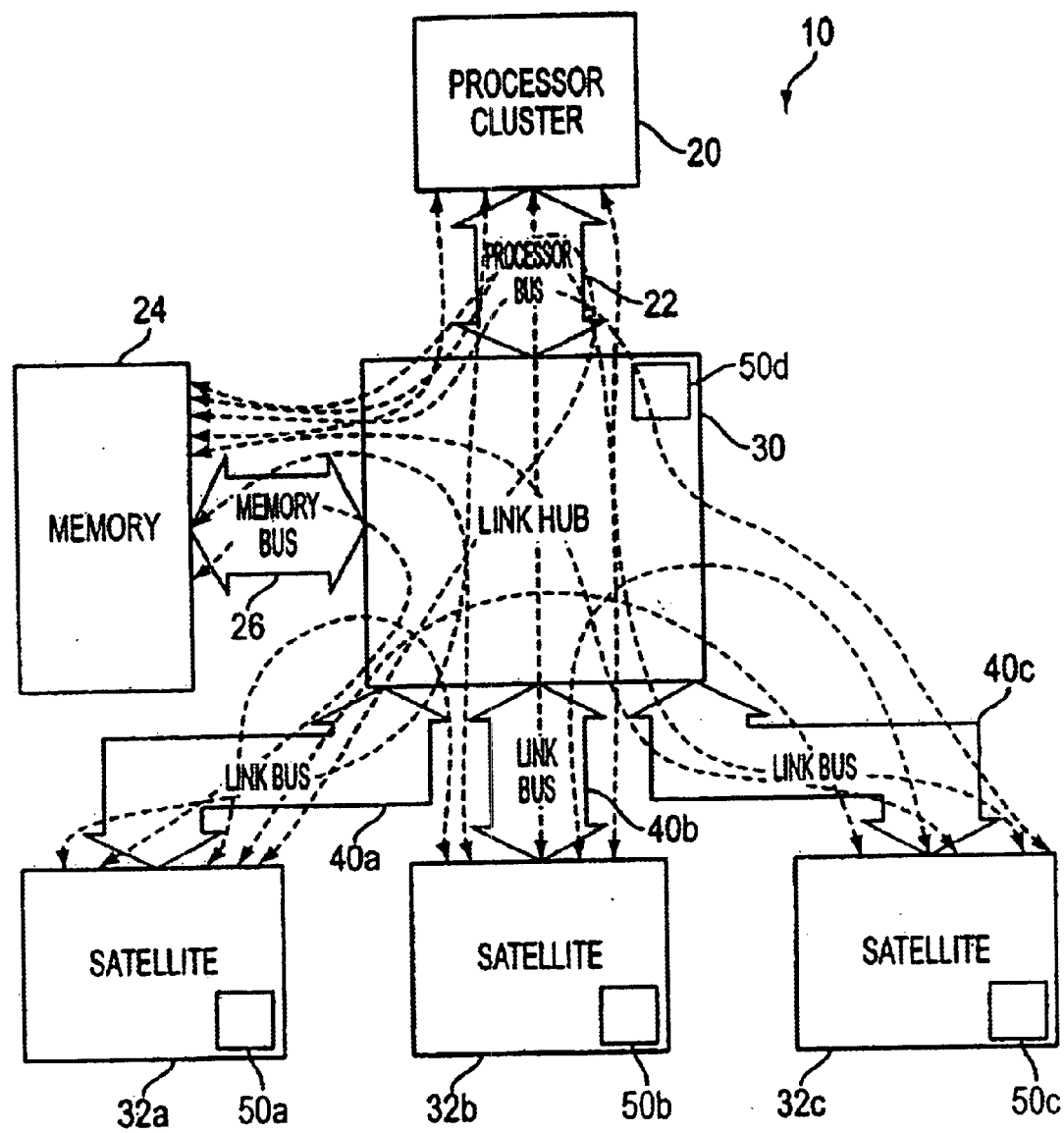
FIG. 1 is a hub based computer system utilizing link buses constructed in accordance with an exemplary embodiment of the invention.

FIG. 1 is a hub based computer system 10 utilizing link buses 40a, 40b, 40c (collectively referred to herein as "link buses 40") in accordance with an exemplary embodiment of the invention. The system 10 includes a processor cluster 20, a memory device 24, a link hub 30 and a plurality of satellite devices 32a, 32b, 32c (collectively referred to herein as "satellite devices 32"). The processor cluster 20 may contain one or many processor units. Although not required to practice the invention, if more than one processing unit is contained within the cluster 20, they are preferably identical to each other. The satellite devices 32 can be bridges or hubs to industry standard buses, such as e.g., PCI, PCI-X and AGP, or the devices 32 can be other components typically found in a computer system. The devices 32 can be connected to one or more I/O devices if so desired.

The link hub 30 is connected to the processor cluster 20 by a dedicated processor bus 22. The link hub 30 is connected to the memory device 24 by a dedicated memory bus 26. It is desirable to used dedicated processor and memory buses 22, 26 to minimize any latencies on transfers to/from the processor cluster 20 and to/from the memory device 24. The link hub 30 is connected to each satellite device 32a, 32b, 32c by a link bus 40a, 40b, 40c (collectively referred to herein as "link buses 40"). Each link bus 40a, 40b, 40c is substantially the same. As will be described below in more detail, each link bus 40a, 40b, 40c adheres to a predefined link bus protocol, which makes the interface between the link hub 30 and the devices 32 generic. With these connections to the link hub 30, every component in the system can communicate with each other through the hub 30. Possible communication paths between the system components are represented by the dashed-lines on FIG. 1.

As will become apparent, the use of the link buses 40 and link bus protocol allows events to be reported without the use of dedicated connections between satellite devices 32, or between the devices 32 and the link hub 30. Thus, the system 10 is scaleable and substantially easy to setup, reconfigure and upgrade. Moreover, the use of the link buses 40 and link bus protocol provides an efficient method of flushing data buffers 50a, 50b, 50c and 50d in the system 10 by allowing individual data buffers 50a, 50b, 50c and 50d to be targeted and flushed. This also improves the performance of the system 10.

It is desirable that the system 10 be a high performance, I/O intensive computer system. For example, the system 10 may be a server computer system or a computer workstation. It should be apparent that the invention is not limited to a particular type of environment/system or to particular devices 32 used in the system 10. All that is required to practice the invention is to provide a link bus 40 between the link hub 30 and the satellite devices 32 that must communicate with other satellite devices 32, processor cluster 20 or memory device 24. In addition, each satellite device and the link hub 30 must adhere to the link bus protocol.

A brief description of the link bus 40 is now provided. A more detailed description of the link bus 40, as well as the link bus protocol, will be provided below with respect to FIGS. 3–5. Briefly, the link bus 40 is a low pin count, high bandwidth bus that is used to transfer data and exchange messages between the components in the system 10. In a preferred embodiment, the link bus 40 consists of eight or sixteen command/address/data lines, two source strobe clock signal lines and a status signal line. Communications over the link bus 40 adhere to a link bus protocol that is described below in more detail.

The link bus is scaleable, and configurable to support high bandwidths such as e.g., 1 giga-byte per second (GB/s) and 500 mega-bytes per second (MB/s). The link bus 40 preferably uses a quad pumping technique that transfers command, address and data information four times per clock period. That is, in a preferred embodiment, the link bus 40 is a quad pumped bus. It should be noted that the link bus 40 could use double pumping (i.e., transfers information two times per clock period) or a single pumping techniques if so desired. Thus, the invention is not limited to a link bus 40 that is a quad pumped bus.

As noted above, in a conventional computer system, sometimes the satellite devices 32 are connected to each other by hardwired connections/pins. For example, if the system 10 included conventional PCI compatible satellite devices 32, then the system 10 would most likely contain a south bridge device (e.g., device 32a). As is known in the art, the south bridge sometimes communicates certain events or signals to other satellite devices 32 using specialized hardwired pins/connection (i.e., communicates without sending information to the hub). The signals transmitted over these special connections are often referred to as sideband signals. As noted earlier, it is desirable to eliminate these extra pins/connections to make the system 10 more scaleable, configurable and easy to upgrade. Thus, the present invention allows the south bridge (e.g., device 32a) to communicate these special events or signals over its link bus (e.g., bus 40a) through the hub 30 and to another device (e.g., device 32b) via another link bus (e.g., bus 40b). As will become apparent, regardless of the type of satellite devices 32 used, the present invention will transport sideband signals over link buses 40 (via the link bus protocol) instead of employing specialized connections. This will substantially eliminate extra pins/connections between the devices 32 and substantially minimize the need for glue logic devices.

Figure 2:
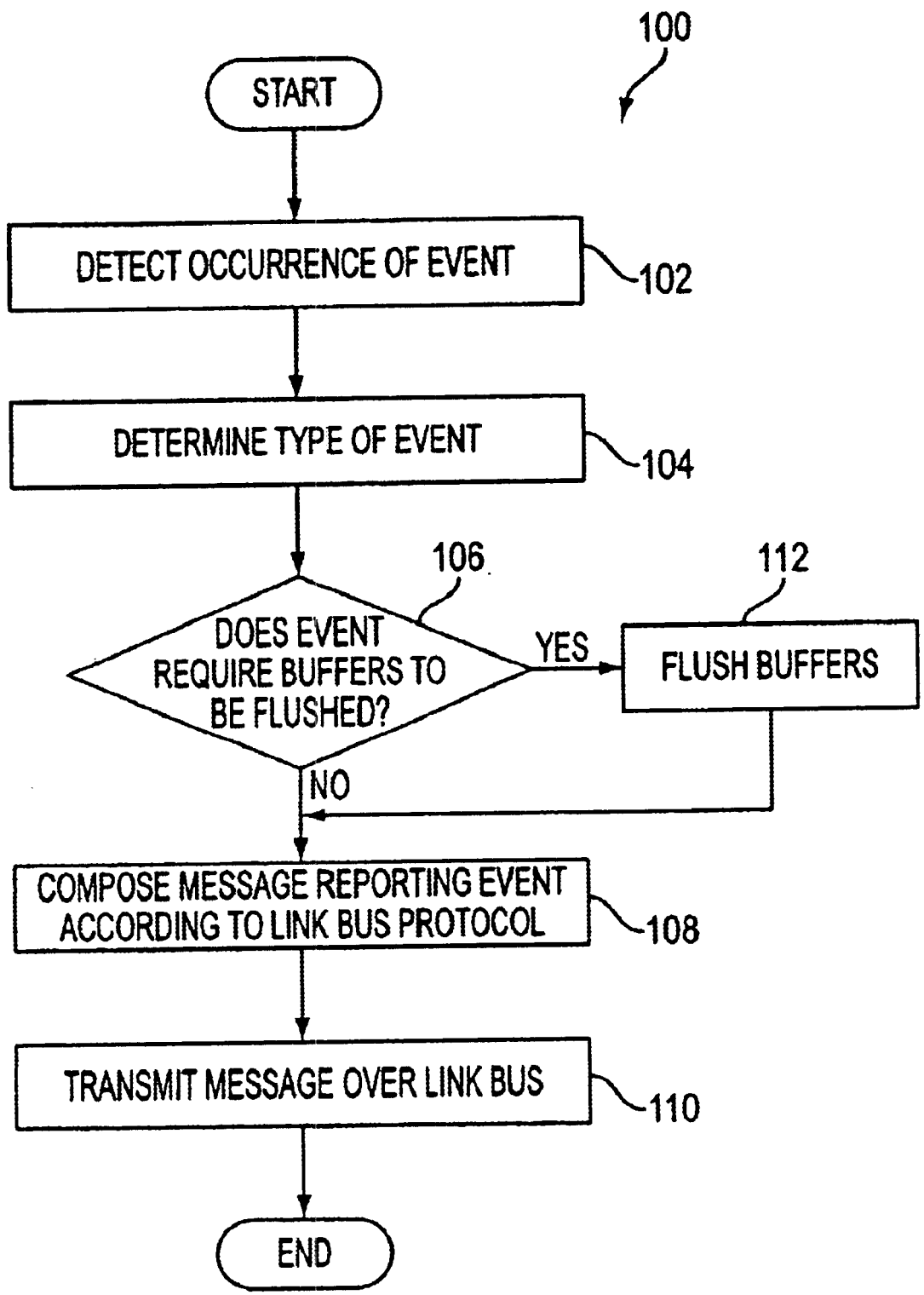
FIG. 2 is an exemplary method of reporting events and flushing data buffers used in the system illustrated in FIG. 1.

FIG. 2 illustrates an exemplary method 100 of reporting events and flushing data buffers used in the system 10 (FIG. 1). The method 100 is implemented through the use of respective link buses between each satellite device and the link hub and the link bus protocol described in detail below.

At step 102, an event is detected by one of the satellite devices. As used herein, an "event" comprises a change of state of any of the industry standard bus signals. That is, an event may be detected/generated when a signal goes active while another event may be detected/generated when the signal goes inactive. As an example, if a satellite device is connected to a PCI bus, then some of the signals that can give rise to an event include the PERR and SERR signals as well as interrupts (e.g., INTA, INTB, INTC, INTD). Thus, if a satellite device connected to the PCI bus detects a that the PERR signal has transitioned from an inactive state to an active state, then the satellite has detected an occurrence of an event. According to the method 100 of the invention and the link bus protocol, this event will be reported to the appropriate device in the system via a message transmitted over a link bus 40 (FIG. 1) instead of via a hardwired connection.

At step 104, the satellite device determines the type of event that was detected and also determines what device(s) the event should be reported to. This can be done by referencing a table, register or other configuration information stored on the satellite device (described below in more detail). The stored information can reside in software, hardware or a combination of hardware and software if so desired. The satellite device will also determine if the event requires data buffers to be flushed (step 106). As noted earlier, certain events require that data buffers be flushed to ensure coherency in memory. A list of these events and which buffers that must be flushed can also be stored in a table, register or other storage mechanism in software, hardware or a combination of hardware and software.

Buffers that may require flushing include upstream buffers (i.e., upstream from the satellite device or an industry standard bus (e.g., PCI bus) the satellite device is connected to) such as e.g., all buffers between the satellite device and the system main memory. In one exemplary embodiment, the upstream buffers would include the upstream buffers in the satellite device receiving the event and the upstream buffers in the link hub. For certain events like interrupts, data that may have been posted in these upstream buffers must be flushed to main memory to ensure memory coherency. Coherency must be assured because an upstream write in the upstream buffers may be to a memory location in which the processor cluster will read as a result of the event.

If at step 106 it is determined that data buffers should be flushed, then the method 100 proceeds to step 112, where the satellite device will flush all necessary upstream (e.g., on the device and the link hub) data buffers to main memory. Thus, the link bus protocol establishes that only the data buffers that need to be flushed by the satellite device (and/or link hub if necessary) are the ones flushed. The protocol also guarantees to the recipient of the event message that the buffers are already flushed upon receipt of the message and that the recipient does not have to wait for the buffers to be flushed before acting on the event message. Thus, system performance is substantially improved.

After flushing the buffers (step 112) or if it is determined that data buffers should not be flushed (step 106), then the method 100 proceeds to step 108 where the event message is composed in accordance with the link bus protocol. As will be described below in more detail, the link bus protocol establishes that each device has its own unique identifier ("ID"). The ID of the sender of the event message is included as part of the message (as well as other messages transmitted over the link bus). In addition, the ID of the intended recipient of the event message is included as part of the message (as well as other messages transmitted over the link bus). The event message will identify itself as an event message and will also identify what the event was. The message may include additional information, if required. Once the event message is composed, it is transmitted over the link bus to the link hub (step 110). The link hub uses the information in the event message to forward it to the appropriate device (if needed).

One example of the method 100 would include the situation where a satellite device is connected to the PCI bus and detects a change in the state of one of the PCI bus signals. In this example, the signal is an interrupt e.g., INTA that must be reported to the south bridge. The south bridge may then issue an interrupt to the processing cluster. The interrupt requires data buffers to be flushed.

Thus, the method 100 begins when the satellite device detects the interrupt signal INTA has gone active (step 102) and has determined the type of event detected (step 104). The satellite device uses look-up tables, etc. to determine if data buffers are to be flushed (step 106) and flushes them if necessary (step 112). The satellite device composes the event message, which includes the ID of the satellite device, ID of the south bridge and information identifying what the event is (e.g., INTA) (step 108). The event message is sent to the link hub over the link bus. The link hub forwards the message to the intended recipient of the message, e.g., the south bridge (step 110). Upon receipt of the message, the south bridge acts on the message as soon as possible (e.g., prepares to issue an interrupt to the processing cluster) because it knows that the link bus protocol warrants that any buffers that need to be flushed have already been flushed prior to the receipt of the message.

Thus, the method 100 of the invention allows satellite devices to report events to other devices without dedicated wiring/pins between the devices as is currently performed in the prior art. In addition, the flushing of data buffers is governed by the link bus protocol such that only targeted data buffers are flushed, which reduces interrupt latency and allows the recipient of the event to act on the event immediately and thus, improves overall system performance.

Figure 3:
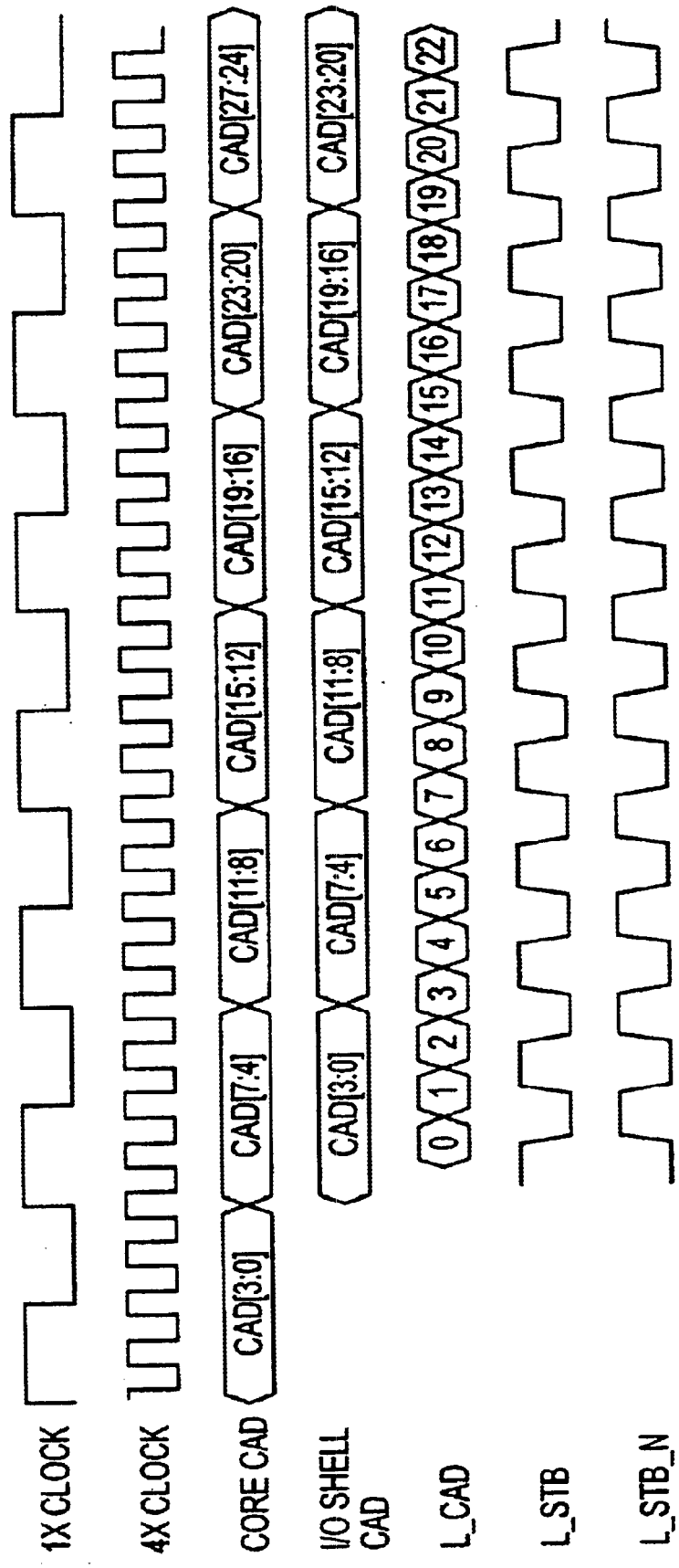
FIGS. 3–5 are timing diagrams illustrating the timing of transmit and receipt of command/address/data in accordance with an exemplary protocol of the invention.
Figure 4:
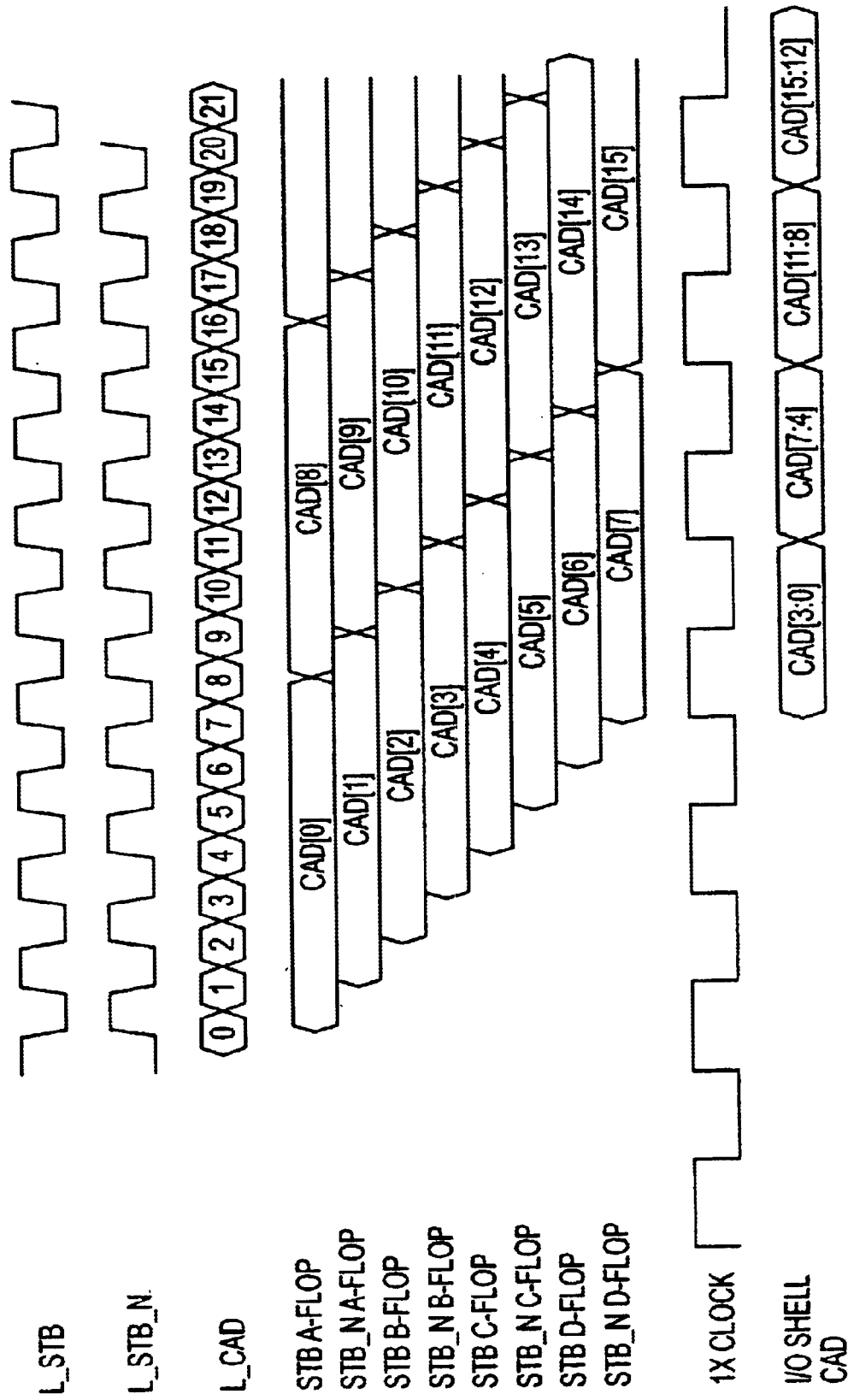
Figure 5:
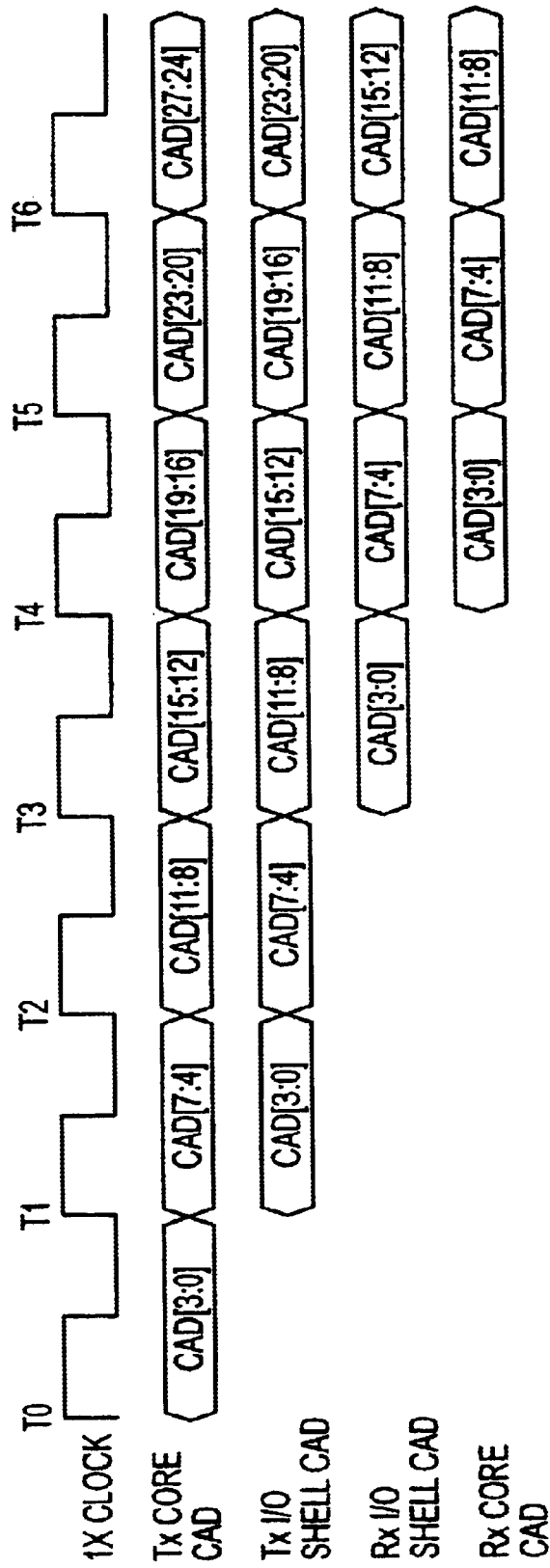

Referring to FIGS. 3–5, an exemplary link bus and link bus protocol are now described. It should be noted that memory transfers will most likely make up the majority of the transfers across the link bus. Burst operations form the vast majority of transfers from the satellite devices as I/O devices, but partial reads/writes shall also be supported. It is desirable for burst transfers to be aligned on 64-byte boundaries. If a PCI-X device communicates over the link bus, the device will indicate it's intention to transfer up to 4K bytes and if PCI devices are used, PCI pre-fetching can also support bursts greater than 64-bytes. Thus, it is desirable for the link bus to include a mechanism to request 4K bytes of data per request. Partial transfers will transfer less than the minimum burst size. These transfers are primarily partial writes with byte enables. Byte enables must then be encoded in the link bus request phase.

In a preferred implementation of the link bus protocol, each satellite device will appear to software as a bridge of some sort. This allows a simple address decode model for each of the satellite devices. For example, in systems including PCI buses, each satellite device will report as a PCI-PCI bridge and in systems using PCI-X buses, each satellite device will report as a PCI-X-PCI-X bridge. In these example systems, only the south bridge, which may itself be a satellite device, will report as a different device. The PCI bridge model works well to decode transfers from the satellite device going upstream to the link hub. The link hub will, by necessity, need to know the addresses mapped in each of the satellite devices in order to move transfers downstream, and in a lateral direction (peer to peer transfers).

In PCI systems, for example, PCI configuration address space is used to allocate memory resources, as well as other configuration attributes, in the system. Registers within the PCI configuration space are used to define memory and I/O address spaces. This configuration information is used to decide addresses of transfers going both upstream and downstream from the link hub. Addresses that are going downstream must fall within a programmed address range while addresses going upstream must fall outside a programmed address range. Due to the hub based architecture of the system, configuration information must exist in the upstream device (e.g., link hub) and the downstream device (e.g., satellite device). This means that the function of a PCI-PCI bridge, for example, is performed by two independently operating devices—one device initiating downstream transfers and one device initiating upstream transfers.

Figure 6:
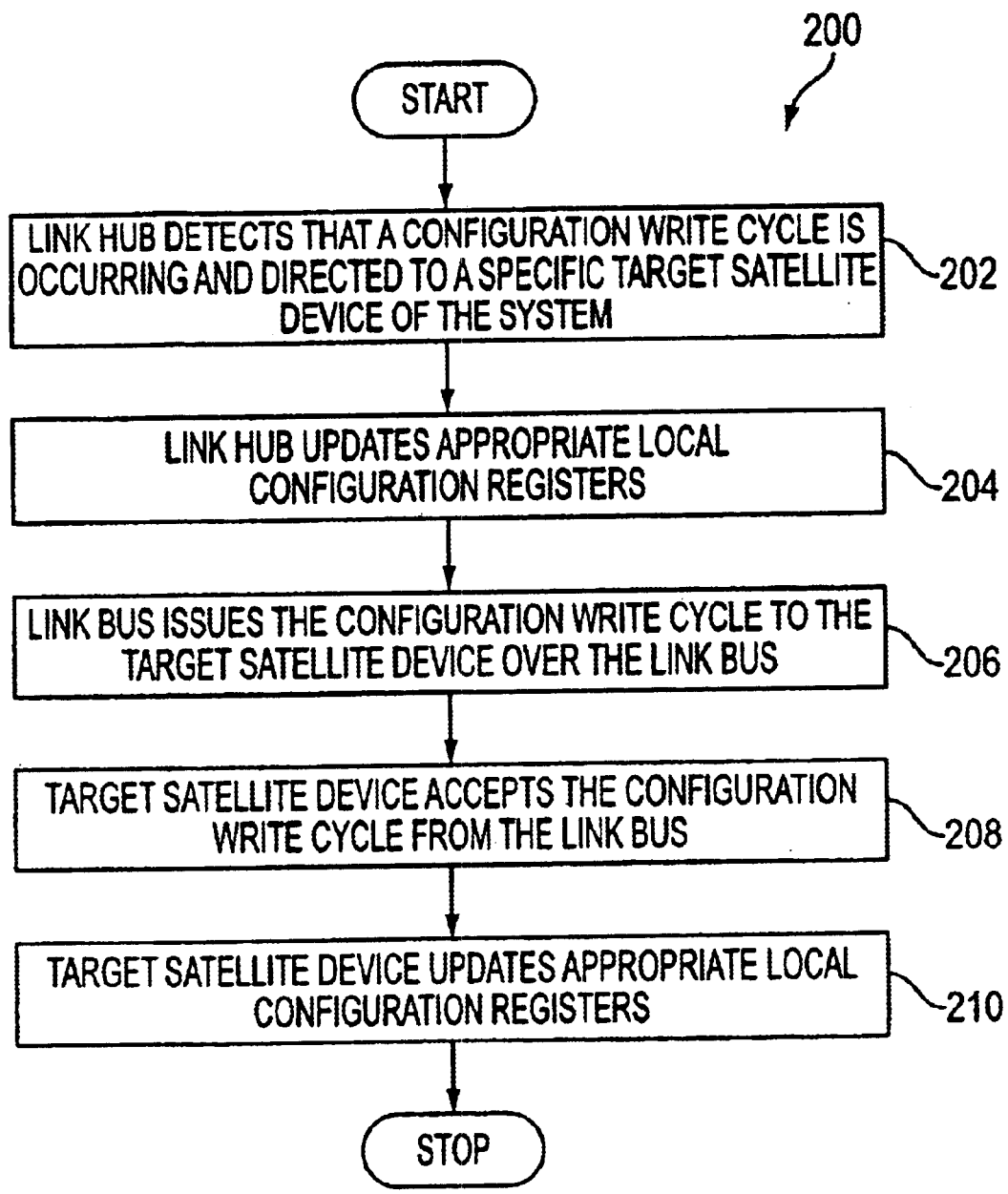
FIG. 6 is an exemplary method of distributing configuration information in the system illustrated in FIG. 1.

Thus, the same configuration information must exist in both the satellite device and the link hub. One method 200 of distributing configuration information is illustrated in FIG. 6. It should be noted that in current systems there is no software model for uniquely addressing each device so that they may be programmed with the appropriate configuration information. In order to function properly within existing software models, both the satellite device and the link hub must be configured with the same information in one configuration cycle, which is what the exemplary method 200 does.

It should be noted that configuration writes cycle is typically initiated by the processor cluster when the cluster accesses multiple registers in the I/O space as defined by the standard bus protocol (e.g., PCI bus). In the exemplary method 200, the link hub will translate the multiple accesses into a single write access. The single access is then directed to the satellite device over the link bus.

The method 200 begins when the link hub detects that a configuration write cycle is occurring and directed to a specific target satellite device (step 202). The link hub updates local configuration registers corresponding to the target satellite device (step 204). Once the local registers are set, the link bus issues the configuration write cycle to the target satellite device over the link bus (step 206). The target satellite device detects and accepts the configuration write cycle sent by the link hub (step 208) and uses the cycle information to update its local registers (step 210). Once the satellite device updates it local registers, the link hub and the satellite device will be configured to perform downstream and upstream transfers, respectively. Thus, the method 200 is capable of configuring the hub and the target device in a single processor cluster initiated configuration write cycle.

As noted above, once the link hub and the various devices are configured, data transfers can be made throughout the system. Because some of today's (and future) industry standard buses support split transactions, it is desirable for the link bus protocol to support split transactions as well. For example, the PCI-X standard supports split-transactions to free up the bus. A split-transaction request is issued, and some time later the target of the original request issues a split completion. This is similar to the deferred request of some processor families, which would then be responded to by the target using a defer reply. The split-transaction mechanism is an elegant way to free up the bus for other transactions while a target is kept busy performing the transaction request. The link bus protocol also utilizes the split-transaction mechanism.

Some additional industry standard rules shall also be observed by the link bus protocol. For example, PCI-X includes a status bit that indicates the transfer can use relaxed ordering rules. This will speed up transfers by eliminating buffer flushing along the data path. It is desirable that the link bus protocol include relaxed order status. In addition, PCI-X includes a status bit that indicates the transfer does not need to perform a snoop operation on the processor caches (e.g., it is known in the art to inspect i.e., snoop, a bus to determine when a write operation is occurring and if the write operation is detected, to update the processor caches). Transfers of this type may proceed directly to memory without snooping the processor caches. It is desirable that the link bus protocol include a "no snooping" option as well.

In a preferred embodiment, the link bus consists of an 8-bit or a 16-bit command/address/data bus L_CAD and two source strobed clock signals L_STB, L_STB_N as shown below in Table I. A single status signal L_ST is used to exchange flow control information between devices. Optionally, byte enables may be issued coincident with each data phase. Exemplary formats for the L_CAD, L_STB, L_STB_N and L_ST signals will be described below in more detail.

TABLE I

| Signal | Type | Count | Description |
| --- | --- | --- | --- |
| L_CAD[15:0] | In/Out | 16 | Link bus command/address/data |
| L_CAD[17:16] | In/Out | 2 | Optional byte enables for write data. Not needed for all link bus configurations. |
| L_STB | In/Out | 1 | Link bus strobe |
| L_STB_N | In/Out | 1 | Link bus strobe Not |
| L_ST | In/Out | 1 | Link bus status |

FIG. 3 is an exemplary diagram illustrating the timing of the transferring of command/address/data onto the link bus by one of the satellite devices (or link hub). In one embodiment of the link bus, the system clock will be distributed internally by a phase-locked loop (PLL) capable of generating both a "1×" clock (i.e., data transferred one-time per clock tick) and "4×" clock (i.e., data transferred four-times per clock tick). FIG. 3 illustrates the 1× and 4× clock signals, command/address/data ("CAD") from the core logic of the device, CAD latched in an I/O shell and the link bus signals L_CAD, L_STB and L_STB_N.

In the transmit waveform of the link bus, CAD is issued from the core logic on the device in the 1× clock domain and captured in an I/O macro (i.e., I/O shell) in the 1× clock domain. Once in the I/O macro, the CAD is multiplexed from the 1× clock domain to the 4× clock domain. Once in the 4× domain, the CAD is driven onto the link bus as the L_CAD signals. The source strobed clock signals L_STB, L_STB_N are also driven onto the link bus to generate strobes at two-times the system clock frequency. The source strobed clock signals L_STB, L_STB_N are driven at two-times the system clock frequency so the receiver only has to work with one edge of each strobe L_STB, L_STB_N, eliminating concerns about strobe asymmetry.

In an exemplary embodiment, four strobes L_STB, L_STB_N are associated with each clock cycle. In the exemplary embodiment, the link bus protocol will not allow fewer than four strobes per clock cycle. 64-bits of data may therefore be transferred every clock cycle in a 16-bit link bus configuration. Similarly, in a 8-bit link bus configuration, 32-bits of data may be transferred per clock cycle. It is also desirable for data to be transferred along 8-byte address boundaries. Thus, a 16-bit link bus configuration may transfer 8-bytes in one clock cycle, while the 8-bit link bus transfers data in two clocks cycles.

Once the signals are transmitted onto the link bus, another device may receive the signals in accordance with the link bus protocol. Referring now to FIG. 4, the timing of the receipt of the link bus command/address/data L_CAD and source strobed clock signals L_STB, L_STB_N is now described. The target device will receive the L_CAD and strobes L_STB, L_STB_N after some delay. The received information should then be synchronized back into the 1× clock domain. For each strobe of the source strobed clock signals L_STB, L_STB_N, there is an A, B, C and D latch or flip-flop in the receiver I/O macro. L_CAD information is clocked into each flip-flop as CAD information in a ping-pong fashion so that timing may be met. The CAD is then transmitted to the 1× clock domain in the I/O macro through a 4-1 multiplexer. Once in the 1× clock domain, the CAD is available to the receiver's core logic.

FIG. 5 shows a generalized view of the transfer of command/address/data from the time that it is available in the core logic of the transmitting device, to the time that it is available to the core logic of the receiving device. This generalized view does not show the intermediate steps of quad pumping across the link bus. For the purpose of illustration, it is assumed that CAD is quad pumped as illustrated in FIGS. 3 and 4. It should be noted that it takes five clock cycles from the time a state decision is made in the transmitter core (time T0), to the time the receiver core can act on that information (time T4). It should be appreciated that the above described timing diagrams are mere illustrations of exemplary embodiments of the link bus and link bus protocols and that the invention is not limited to any specific timing.

It is desirable for data to be paced only on certain naturally aligned data boundaries (ADB's). An ADB is an amount of data that may be transferred across the link bus in a certain number of clock cycles. In one embodiment, the ADB is the amount of data that may be transferred across the link bus in eight clock cycles. Examples of ADBs would include 64-bytes for a 16-bit link bus and 32-bytes for an 8-bit link bus. The pacing of information on the link bus is described in co-pending application Ser. No. 09730,774, entitled "Method of Pacing and Disconnecting Transfers on a Source Strobed Bus," which is hereby incorporated by reference in its entirety.

As noted above, in addition to the clock forwarded quad-pumped command/address/data L_CAD portion of the link bus, there is a single-bit link status signal L_ST. The link status signal L_ST time multiplexes arbitration and data flow information. For every transaction, one device connected to the link bus will serve as a bus master and the other device will serve as the bus slave. Data may be stalled by either the master, or the slave by defining certain windows during a transfer in which the status may be driven and observed. In a typical situation, the transferring device serves as the master, while the receiving device (i.e., the target) serves as the slave. The target may request its desire to become the link master by time multiplexing an arbitration request on the status signal L_ST.

Each device connected to a particular the link bus is given the opportunity to arbitrate for the link bus. Typically, when a source strobed bus is used, one device (e.g., memory controller) always serves as the bus master, while the other device (e.g., memory device) always serves as the bus slave. In the present invention, however, either device can serve as the master. In one exemplary embodiment of the invention, the link bus follows a round-robin arbitration method. Due to the split-transaction nature of the link bus, both devices must have a fair opportunity to access the link bus to prevent deadlocks. There is no central arbitration point which decides who is granted the bus. Instead, the arbitration is decentralized with each device observing certain state information to decide which of the devices is the bus master. A device that is not currently the bus master (i.e., the target) may request to become a bus master by time multiplexing an arbitration request on the link status signal L_ST. The arbitration protocol allows bus parking, and back-to-back transfers to minimize latencies and improve performance. The arbitration of the bus is distributed between the two Link entities, as is described in co-pending application Ser. No. 09/730,780, entitled "Arbitration Method for a Source Strobed Bus," which is hereby incorporated by reference in its entirety.

Now that the basic functions and timing of an exemplary link bus and link bus protocol have been described, the following now describes the format and content of the information packets transmitted over the link bus. One packet of information is the command packet. A command packet is issued by the current link bus master and may include information such as command, address, transfer count, as well as other attributes needed in the system. An exemplary command packet format is illustrated below in Table II. It should be noted that the formatting illustrated in Table II (and Tables III–IX) are examples of the type of format/content that may be used to implement the link bus and link bus protocol. Specific bit fields or sizes of the fields are not given in the Tables because the invention is not limited to any specific field size or position (i.e., bit position) within the packet.

TABLE II

| Field | Description |
|---|---|
| Command | Bus Command |
| Address | During memory transactions this field represents a portion of the address. |

TABLE II-continued

| Field | Description |
|---|---|
| Count/Enable | During block transfers, this field represents the number bytes to transfer. During partial transfers this field represents byte enables. |
| Command attribute | The command attribute field is defined differently for split completion commands and all other commands. For split completion commands this field indicates the completion status of an earlier requested transfer. For all other commands the field indicates transfer attributes of the current request. |

As can be seen from Table II, an exemplary command packet may include command, address, transfer count or byte enable and attribute fields. Exemplary commands that can occupy the command field are illustrated below in Table III. In an exemplary embodiment, the link bus supports split transactions. Thus, the command attribute field is defined differently for split completion commands than all other command requests. Table IV illustrates exemplary definitions for the attribute field for all normal commands, while Table V illustrates exemplary definitions for the attribute field for the split completion command.

TABLE III

| Command | Description |
|---|---|
| Idle | Bus Idle, no requests. All other bits are inactive to conserve power. |
| Split Completion | Split completion reply. Issued in response to a previously issued request to transfer read data, or transfer completion status. |
| Message Read | Message read request such as processor interrupt acknowledge, flush, fence. |
| Message Write | Message write request such as processor special cycles, NOP, interrupt messaging, and error status messaging. |
| Block Memory Read | Request a memory read of e.g., 1 to 4K bytes. Large block memory reads are the preferred transfer method. |
| Block Memory Write | Request a memory write of e.g., 1 to 4K bytes. Byte enables for all requested bytes are assumed active. Large block memory writes are the preferred transfer method |
| Partial Memory Read | Request a memory read of bytes less than the block read. |
| Partial Memory Write | Request a memory write of bytes less than block write. |
| Configuration Read | Read Configuration data. Address is encoded similar to PCI Type 1 configuration cycles. The Link target must decode to determine if transfer is target internally or to subordinate bus. |
| Configuration Write | Write Configuration data. Address is encoded similar to PCI Type 1 configuration cycles. The Link target must decode to determine if transfer is target internally or to subordinate bus. |
| I/O Read | I/O read data. |
| I/O Write | I/O write data. |
| Reserved | Reserved Commands. |

TABLE IV

| Field | Description |
|---|---|
| Relaxed Ordering Rules | Indicates that the target may use relaxed ordering rules to transfer data. |
| No Snoop | Indicates that memory accesses do not need to be snooped. Not valid for non-memory transfers. |
| No Split-Completion | Indicates that no split-completion message is expected by the master. For writes, this |

TABLE IV-continued

| Field | Description |
| --- | --- |
|  | indicates that the transfer is posted, and the master assumes the target shall perform the steps necessary to complete it on the subordinate bus. |
| Lock | Indicates the status of bus lock issued by the processor. Only valid during processor initiated transfers. Note this does not lock the link bus, only the target bus subordinate to the link bus. |

TABLE V

| Field | Description |
| --- | --- |
| Retry | Indicates that the target has retried the transaction. |
| Request Complete | Indicates that the read/write request has completed normally. |
| RD/WR | Indicates that the split completion is issued in response to a read or write request. |
| No Data | Indicates that no data is transferred, and the value of the Count/Enable field is invalid. |
| Split Completion Error | Indicates that an error occurred during the split completion. |
| Split Completion Error Status | Indicates the type of completion error as defined in e.g., PCI-X. |

The address field identifies the address of the target request. The address field is slightly different for each of the commands. Table VI illustrates one way in which the address field may vary dependent upon the command field.

TABLE VI

| Command | Address Field Description |
| --- | --- |
| Idle | All address bits in the low power state. |
| Split Completion. | Copy of the original split-transaction tag issued with the original request. All other bits are reserved. |
| Message Read | See Table VII |
| Message Write | See Table VIII |
| Block Memory Read | Address of the memory request. |
| Block Memory Write |  |
| Partial Memory Read | Address of the memory request. |
| Partial Memory Write |  |
| Configuration Read | Address of Configuration address register (e.g., I/O register). |
| Configuration Write |  |
| I/O Read | Address of the I/O request. |
| I/O Write |  |
| Reserved | Reserved. Should be driven to the low power state. |

The address field requires a more detailed definition for message read and write commands. Exemplary address fields for write commands are found in Table VII, while exemplary address fields for read commands are found in table VIII.

TABLE VII

| Command | Description |
| --- | --- |
| Shutdown Special Cycle | Processor special cycle |
| Halt Special Cycle | Processor special cycle |
| Stop Clock Grant Special Cycle | Processor special cycle |
| x86 architecture specific | Processor special cycle |
| NOP | No Operation. May be issued from any link device. |
| Interrupt Event | One or more interrupt lines from a satellite |

TABLE VII-continued

| Command | Description |
| --- | --- |
|  | have changed states. |
| PERR Event | Change in PERR status. |
| SERR Event | Change in SERR status. |

TABLE VIII

| Command | Description |
| --- | --- |
| Interrupt Acknowledge | Processor interrupt acknowledge |
| Flush | Flush buffers |
| Fence | Fence buffers |

In an exemplary embodiment, a split-transaction tag is used to identify the source of a request so that it may be later replied to with a split completion request. The tag is defined to interface with similar tags used for various processors and is described in Table IX.

TABLE IX

| Field | Description |
| --- | --- |
| Agent Type | Identifies the Agent as a processor, link bus satellite, or link hub. |
| Agent Tag | Identifies a particular request of the initiating Agent. This field is large enough to carry information from the processor cluster, or a PCI-X agent |
| Agent Bus Number | The PCI Bus number of the requesting device |
| Agent Device Number | The PCI device number of the requesting device |
| Agent Function number | The PCI function number of the requesting device |

Now that the exemplary format/content of command packets have been described, the following now describes an exemplary set of rules required to adhere to the link bus protocol. As much of the control information is time multiplexed across the status signal L_ST, there are certain rules that must be observed by the link master and slave to determine when information is valid and when the information can be driven on the link bus. When a device drives the status signal L_ST low, it will always drive it high one clock before tri-stating the signal L_ST.

Another rule governs the response of the target device (i.e., receiver). For example, a response must be issued by the target 1 clock cycle after observing the transfer request in the clock domain. The response must be observed by the master 4 clocks cycles after issuing the transfer request in the clock domain. Otherwise the response will be deemed invalid. In addition, the transfer shall be terminated by the master 1 clock after observing a response retry signal. It should be noted that the link bus protocol requires other rules governing the arbitration and data stalls processes. These rules, however, are not described herein because they are described in the co-pending applications previously identified above.

As noted earlier, the present invention capitalizes on the link bus and the link bus protocol to allow satellite devices to report events such as interrupts, status indications and errors to other devices in a hub based system without dedicated wiring/pins between the devices. The use of dedicated wiring/pins is a problem with today's hub based systems. Dedicated wiring, etc. makes it difficult to reconfigure and update the system and often requires glue logic to implement changes into the system. By reducing the use of dedicated wiring/pins, the present invention is scalable and easy to maintain, upgrade and reconfigure.

In addition, flushing of data buffers in the present invention is governed by the link bus protocol. By following the protocol, only targeted data buffers are flushed in a system constructed in accordance with the present invention. This improves overall system performance by reducing interrupt latency.

It should be noted that the formats, timings and other definitions describing the link bus and the link bus protocol are mere examples. The invention is not to be limited to the specific examples described herein.

While the invention has been described and illustrated with reference to exemplary embodiments, many variations can be made and equivalents substituted without departing from the spirit or scope of the invention. Accordingly, the invention is not to be understood as being limited by the foregoing description, but is only limited by the scope of the appended claims.

What is claimed as new and desired to be protected by Letters Patent of the United States is:

1. A method of operating a processor based system, the system comprising a hub coupled to a processor by a processor bus and coupled to a memory device by a memory bus, said hub being connected to a first device by a first link bus, the first device communicating with the processor and the memory device via the hub, said method comprising the steps of:
    detecting at the first device an occurrence of an event from a second device connected to the first device;
    identifying an event type of the detected event;
    determining if data buffers of the first device must be flushed based on the indentified event type;
    flushing targeted data buffers of the first device to memory if it is determined that data buffers of the first device must be flushed;
    composing a message identifying the occurrence of the detected event, the message comprising at least the identified event type; and
    transmitting the composed message to the hub over the first link bus.

2. The method of claim 1, wherein the message is composed and transmitted in accordance with a link bus protocol of the first link bus.

3. The method of claim 1, wherein the message further comprises an identity of the first device.

4. The method of claim 1, wherein the hub is connected to a third device via a second link bus and the message further comprises an identity of the first device and an identity of the third device, said method further comprising the step of transmitting the message from the hub to the third device over the second link bus.

5. The method of claim 1, wherein the message further comprises an identity of the first device and an identity of the processor, said method further comprising the step of transmitting the message from the hub to the processor over the processor bus.

6. The method of claim 1, wherein the message further comprises an identity of the first device and an identity of the memory device, said method further comprising the step of transmitting the message from the hub to the memory device over the memory bus.

7. The method of claim 1, wherein the event is an interrupt received at the first device.

8. The method of claim 1, wherein the event is a status indication received at the first device from the second device connected to the first device.

9. The method of claim 1, wherein the event is an error indication received at the first device from the second device connected to the first device.

10. The method of claim 1 further comprising the steps of:
    determining if data buffers of the hub must be flushed based on the event type; and
    flushing targeted data buffers of the hub to memory if it is determined that data buffers of the hub must be flushed.

11. The method of claim 1, wherein said determining and flushing steps occur prior to said transmitting step.

12. The method of claim 1, wherein said determining and flushing steps occur in accordance with a link bus protocol of the first link bus.

13. The method of claim 1, wherein the hub is connected to a third device via a second link bus and the message further comprises an identity of the first device and an identity of the third device, said method further comprising the step of transmitting the message to the third device over the second link bus.

14. The method of claim 1 further comprising the steps of:
    detecting at the hub that a configuration write cycle has occurred;
    updating registers local to the hub based on the detected configuration write cycle; and
    forwarding the configuration write cycle to the first device.

15. The method of claim 14, wherein the configuration write cycle comprises a first address associated with the first device and said updating step comprises storing the first address so that the hub can transmit messages to the first device based on the stored first address.

16. The method of claim 14 further comprising the steps of:
    receiving at the first device the forwarded configuration write cycle; and
    updating registers local to the first device based on the forwarded configuration write cycle.

17. A method of operating a processor based system, the system comprising a hub coupled to a processor by a processor bus and coupled to a memory device by a memory bus, said hub being connected to a first device by a first link bus, the first device communicating with the processor and the memory device via the hub, said method comprising the steps of:
    detecting at the first device an occurrence of an event;
    identifying an event type of the event;
    composing a message identifying the occurrence of the event, the message comprising at least the identified event type;
    transmitting the composed message to the hub over the first link bus;
    detecting at the hub that a configuration write cycle has occurred;
    updating registers local to the hub based on the detected configuration write cycle;
    forwarding the configuration write cycle to the first device;
    receiving at the first device the forwarded configuration write cycle; and
    updating registers local to the first device based on the forwarded configuration write cycle,
    wherein the forwarded configuration write cycle comprises a first address associated with the first device and a second address associated with the hub, and wherein said step of updating registers local to the first device comprises storing the first address so that the first device can identify itself to the hub and said step of updating registers local to the first device further comprises storing the second address so that the first device can transmit messages to the hub.

18. A method of operating a hub based processor system, the system comprising a link hub connected to a first satellite device by a first link bus, the link hub being connected to a processor via a processor bus and a memory device via a memory bus, said method comprising the steps of:

detecting at the first satellite device an occurrence of an event from a second satellite device connected to the first satellite device;

determining if data buffers of the first satellite device must be flushed based on an identity of the event;

flushing targeted data buffers of the first satellite device to memory if it is determined that data buffers of the first satellite device must be flushed; and transmitting a message identifying the occurrence and identity of the event to the link hub over the first link bus, wherein said detecting step through said transmitting step occur in accordance with a link bus protocol associated with the first link bus.

19. The method of claim 18 further comprising the steps of:

detecting at the link hub that a configuration write cycle has occurred;

updating registers local to the link hub based art the detected configuration write cycle; and forwarding the configuration write cycle to the first satellite device.

20. The method of claim 19 further comprising the steps of:

receiving at the first satellite device the forwarded configuration write cycle; and updating registers local to the first satellite device based on the forwarded configuration write cycle.

21. A processor system comprising:

a processor;

a link hub connected to said processor via a processor bus;

a satellite device; and a link bus connected between said link hub and said satellite device, wherein said satellite device can detect an occurrence of an event from a first device connected to the satellite device, report the occurrence of the detected event to said hub by identifying an event type of the detected event, composing a message identifying the occurrence of the event, the message comprising at least the identified event type, and transmitting the composed message over said link bus, said satellite device determines if data buffers of said satellite device must be flushed based on an identity of the event and flushes targeted data buffers of said satellite device if it is determined that data buffers of said satellite device must be flushed.

22. The system of claim 21, wherein the message is transmitted in accordance with a link bus protocol associated with said link bus.

23. The system of claim 21 further comprising:

a second satellite device; and a second link bus, said second satellite device coupled to said link hub via said second link bus, wherein the message further comprises an identity of said second satellite device, and said link hub transmits the message to said second satellite device over said second link bus.

24. The system of claim 21, wherein the event is an interrupt received at said satellite device.

25. The system of claim 21, wherein the event is a status indication received at said satellite device from the first device connected to said satellite device.

26. The system of claim 21, wherein the event is an error indication received at said satellite device from the first device connected to said satellite device.

27. The system of claim 21 wherein said satellite device determines if buffers of said link hub must be flushed based on the identity of the event and flushes targeted data buffers of the link hub if it is determined that data buffers of the link hub must be flushed.

28. The system of claim 21, wherein said satellite device flushes said targeted data buffers prior to transmitting the message.

29. The system of claim 21, wherein said satellite device comprises first local registers and said link hub comprises second local registers, said link hub detects that said processor has initiated a configuration write cycle, updates said second registers based on the detected configuration write cycle, and forwards the configuration write cycle to the satellite device.

30. The system of claim 29 wherein said satellite device receives the forwarded configuration write cycle and updates said first local registers based on the forwarded configuration write cycle.

31. The system of claim 21, wherein said satellite device is connected to another bus.

32. The system of claim 31, wherein said another bus is a PCI bus.

33. The system of claim 31, wherein said another bus is a PCI-X bus.

34. The system of claim 31, wherein said another bus is an AGP bus.

35. The system of claim 31, wherein said satellite device serves as a bridge between said another second bus and said link bus.

36. A processor based system comprising:

a processor;

a link hub connected to said processor by a processor bus;

a satellite device; and a link bus directly connected between said link hub and said satellite device, said link bus being a source strobed bus that comprises a first bus and a first clock strobe signal used to clock information over the first bus, said link bus having a link bus protocol, wherein said satellite device detects and reports an occurrence of an event from a first device connected to said satellite device in accordance with said link bus protocol by strobing said first clock strobe signal and transmitting a command packet over said first bus.

37. The system of claim 36, wherein the command packet comprises a message identifying the occurrence of the event and an identity of said satellite device.

38. The system of claim 37, wherein said message further comprises a command attribute.

39. The system of claim 36 wherein said link hub receives the command packet by detecting said strobing of said first clock strobe signal and inputting the command packet.

40. The system of claim 39, wherein said link hub must receive the command packet within a predetermined period for information within the packet to be valid.

41. The system of claim 36, wherein said satellite device can target specific buffers of said satellite device and said link hub to be flushed by identifying an event type of the event in accordance with said protocol.

42. The system of claim 41, wherein said link hub can configure its local registers by detecting a configuration cycle initiated by a processor of said system and updating said local registers in accordance with said protocol.

43. The system of claim 42, wherein said satellite device can configure its local registers by receiving a configuration cycle over said link bus and updating said satellite device local registers in accordance with said protocol.

44. The system of claim 36, wherein said link hub further comprises a second clock strobe signal, said second clock strobe signal being a complement of said first clock strobe signal.

45. The system of claim 44, wherein said link bus further comprises a status signal for identifying a status of said first bus.

46. The system of claim 36 wherein commands, addresses and data are transmitted over said first bus.

47. The system of claim 36 wherein said link bus is a double pumped bus.

48. The system of claim 36 wherein said link bus is a quad pumped bus.

49. A processor based system comprising:

a processor;

a link hub connected to said processor by a first bus;

a satellite device; and a link bus directly connected between said link hub and said satellite device such that said satellite device is capable of communicating with said processor via said link bus, said link bus being a source strobe bus that comprises a status signal and a bus portion, said link bus having a link bus protocol, said satellite device detecting and reporting an occurrence of an event from a first device connected to said satellite device to said link hub by transmitting a command packet over said bus portion of said link bus, and wherein said satellite device transmits said status signal in accordance with said link bus protocol to become a master of said link bus during transmissions to said link hub and said link hub transmits said status signal in accordance with said link bus protocol to become a master of said link bus during transmissions to said satellite device.

50. The processor system of claim 49, wherein said bus portion of said link bus is a 16-bit wide, quad pumped bus.

51. The processor system of claim 49, wherein said bus portion of said link bus is an 8-bit wide, quad pumped bus.

* * * * *